(12) United States Patent
Hon-Anderson et al.

(10) Patent No.: US 9,218,807 B2
(45) Date of Patent: Dec. 22, 2015

(54) CALIBRATION OF A SPEECH RECOGNITION ENGINE USING VALIDATED TEXT

(75) Inventors: Eric Hon-Anderson, Bedford, MA (US); Robert W. Stuller, New London, CT (US)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 458 days.

(21) Appl. No.: 12/986,855

(22) Filed: Jan. 7, 2011

(65) Prior Publication Data

US 2011/0301940 A1  Dec. 8, 2011

Related U.S. Application Data

(60) Provisional application No. 61/293,291, filed on Jan. 8, 2010.

(51) Int. Cl.
*G10L 15/06* (2013.01)
*G10L 15/193* (2013.01)

(52) U.S. Cl.
CPC ............ *G10L 15/063* (2013.01); *G10L 15/193* (2013.01); *G10L 2015/0638* (2013.01)

(58) Field of Classification Search
CPC ............... G10L 15/063; G10L 2015/0638
USPC .................. 704/232, 243, 259, 275
See application file for complete search history.

(56) References Cited

U.S. PATENT DOCUMENTS

| | | | |
|---|---|---|---|
| 5,212,730 A * | 5/1993 | Wheatley et al. | 704/243 |
| 5,749,066 A * | 5/1998 | Nussbaum | 704/232 |
| 5,809,462 A * | 9/1998 | Nussbaum | 704/232 |
| 5,864,803 A * | 1/1999 | Nussbaum | 704/232 |
| 6,799,162 B1 * | 9/2004 | Goronzy et al. | 704/244 |
| 6,879,956 B1 * | 4/2005 | Honda et al. | 704/244 |
| 7,050,550 B2 * | 5/2006 | Steinbiss et al. | 379/88.01 |
| 7,092,888 B1 * | 8/2006 | McCarthy et al. | 704/277 |
| 7,124,081 B1 * | 10/2006 | Bellegarda | 704/255 |
| 7,203,644 B2 * | 4/2007 | Anderson et al. | 704/243 |
| 7,483,833 B2 * | 1/2009 | Peters | 704/270 |
| 7,558,730 B2 * | 7/2009 | Davis et al. | 704/235 |
| 7,609,829 B2 * | 10/2009 | Wang et al. | 379/201.01 |
| 7,660,715 B1 * | 2/2010 | Thambiratnam | 704/244 |
| 7,668,718 B2 * | 2/2010 | Kahn et al. | 704/270 |
| 7,689,420 B2 * | 3/2010 | Paek et al. | 704/257 |
| 7,925,505 B2 * | 4/2011 | Wu | 704/236 |
| 8,204,739 B2 * | 6/2012 | Waibel et al. | 704/10 |
| 2002/0091521 A1 * | 7/2002 | Yuk et al. | 704/240 |
| 2003/0036903 A1 * | 2/2003 | Konopka et al. | 704/249 |

(Continued)

OTHER PUBLICATIONS

Balakrishna et al. "Automatic Creation and Tuning of Context Free Grammars for Interactive Voice Response Systems", Proooeding of NLP, 2005.*

*Primary Examiner* — Jialong He

(74) *Attorney, Agent, or Firm* — Sean D. Detweiler, Esq.; Morse, Barnes-Brown & Pendleton, P.C.

(57) ABSTRACT

A system and method provide acoustic training of a voice or speech recognition engine and/or voice or speech recognition software application. Instead of requiring a user to read from a prepared or predetermined script, the system and method described herein enable acoustic training using any free text spoken phrases provided by the user directly, or by a previously recorded speech, presentation, or the like, performed by the user.

7 Claims, 2 Drawing Sheets

(56) References Cited

U.S. PATENT DOCUMENTS

| | | |
|---|---|---|
| 2003/0093263 A1* | 5/2003 | Chen et al. .................... 704/10 |
| 2003/0220791 A1* | 11/2003 | Toyama ....................... 704/256 |
| 2005/0038657 A1* | 2/2005 | Roth et al. ................... 704/260 |
| 2005/0049868 A1* | 3/2005 | Busayapongchai ........... 704/251 |
| 2005/0159949 A1* | 7/2005 | Yu et al. ....................... 704/235 |
| 2006/0036444 A1* | 2/2006 | Hwang ......................... 704/275 |
| 2006/0190253 A1* | 8/2006 | Hakkani-Tur et al. ........ 704/243 |
| 2007/0276651 A1* | 11/2007 | Bliss et al. ....................... 704/9 |
| 2007/0299664 A1* | 12/2007 | Peters et al. ................. 704/235 |
| 2008/0004876 A1* | 1/2008 | He et al. ...................... 704/243 |
| 2008/0126100 A1* | 5/2008 | Grost et al. .................. 704/275 |
| 2010/0312555 A1* | 12/2010 | Plumpe et al. ............... 704/231 |
| 2011/0131291 A1* | 6/2011 | Hon-Anderson ............. 709/217 |
| 2011/0161075 A1* | 6/2011 | Hon-Anderson ............. 704/201 |
| 2011/0301940 A1* | 12/2011 | Hon-Anderson et al. ........ 704/9 |

\* cited by examiner

CALIBRATION OF A SPEECH RECOGNITION ENGINE USING VALIDATED TEXT

RELATED APPLICATION

This application claims priority to, and the benefit of, U.S. Provisional Application No. 61/293,291, filed Jan. 8, 2010, for all subject matter common to both applications. The disclosure of said provisional application is hereby incorporated by reference in its entirety.

FIELD OF THE INVENTION

The present invention relates to the acoustic training of speech recognition software applications, and more particularly to a speech recognition system that enables the use of unscripted user dialog to train the system to recognize the speech of a particular user, such that the system can be adequately trained without requiring the user to read a scripted collection of words and phrases.

BACKGROUND OF THE INVENTION

Speech recognition and voice processing systems are known for translation of dictated speech into text or computer instructions (such as menu operations, and the like). Conventional speech recognition systems use a number of different algorithms and technologies in a perennial effort to recognize a user's speech and do what the user desires based on that speech recognition. A common application of this technology is in the classic dictation sense, where voice is converted into text in a word processing application. Another application is conversion of voice into common instructions for menu operations, such as open a file, close a file, save a file, copy, paste, etc.

In most systems, there is a computing device with memory, storage, and a processor, that executes a software application enabling the speech recognition functionality. A user speaks into a microphone and the speech recognition software processes the user's voice into text or commands.

There are several performance factors that are considered when assessing these speech recognition applications. Among the factors are speed and accuracy. The users of such applications desire that the applications interpret the user's voice as accurately as possible, so that later editing time is reduced or eliminated, and/or commands are understood. Likewise, the users of such applications also benefit from the applications providing feedback in real-time, so that the user knows as quickly as possible what the application heard and what it is doing in response to the voice input, or that commands are acted on quickly.

When operating a speech recognition software application for the first time, it is highly recommended (and in some instances required) to go through a process of acoustic training. The phrase "acoustic training", as utilized herein, refers to a process that is performed in an effort to improve the quality of speech recognition by speech recognition engines in a single environment. The process attempts to teach the speech recognition engine of the speech recognition software application to recognize and accurately interpret a particular user's voice.

Generally, the training process includes presenting the user with a prepared script. The user is required to read the script aloud into the microphone in communication with the speech recognition software application. The speech recognition engine attempts to recognize the speech and compare it in some manner with the prepared script that it knows. In some instances, speech recognition software applications will provide immediate feedback during this process, accepting or rejecting spoken phrases as matching or not matching the prepared script. If the spoken phrase matches the prepared script, the software application provides the user with the next phrase or sentence to read. If the spoken phrase does not match the prepared script in a way that the speech recognition engine recognizes, the software application will prompt the user to repeat the phrase or sentence until recognition is confirmed, or the phrase or sentence is skipped following multiple failed attempts to match. Historically, such a process has taken over 30 minutes to complete. More recently, acoustic training can be completed faster, but it still requires the user to read the prepared script for some period of time, attempting to get the speech recognition engine to recognize the spoken word, and match it with the prepared script.

SUMMARY

There is a need for a speech recognition software application having an improved process for handling acoustic training, including requiring less time and effort from the user than present systems require, while still performing high quality training of the speech recognition engine. The present invention is directed toward further solutions to address this need, in addition to having other desirable characteristics.

In accordance with one example embodiment of the present invention, a method for acoustically training a speech recognition engine of a speech recognition software application includes receiving audio data at the speech recognition engine. The audio data represents a user's voice speaking at least one phrase. The at least one phrase is unknown to the speech recognition engine in both spoken audio and text forms. The speech recognition engine, using a process performed by a processor, translates the at least one phrase into text form for display to the user. The speech recognition software application receives a reviewed version of the text form containing validated text and, using a process performed by a processor, converts the reviewed version of the text form into a context free grammar based on text indicated as validated text.

In accordance with aspects of the present invention, the speech recognition software application records each instance of validated text.

In accordance with aspects of the present invention, the speech recognition software application may record each instance of validated text, accumulate instances of validated text up to a first predetermined number of instances of validated text or duration of audio signal, and once the first predetermined number of instances of validated text or duration of audio signal has been achieved, the speech recognition software application can perform calibration of the speech recognition engine. Calibration of the speech recognition engine can include the speech engine selecting initial properties of an acoustic match to a voice model.

In accordance with aspects of the present invention, the speech recognition software application can record each instance of validated text, accumulate instances of validated text up to a second predetermined number of instances of validated text or duration of audio signal, and once the second predetermined number of instances of validated text or duration of audio signal has been achieved, the speech recognition software application can perform refining calibration of the speech recognition engine.

In accordance with further aspects of the present invention, the audio data can include a previously recorded audio recording of the user's voice speaking. Alternatively, the audio data can include a real-time data representation of the user's voice speaking.

In accordance with one embodiment of the present invention, a computer-readable storage medium with an executable program stored thereon is provided, wherein the program instructs a processor to perform the following steps. One step performed may include receiving audio data at a speech recognition engine, the audio data representing a user's voice speaking at least one phrase, and the at least one phrase being unknown to the speech recognition engine in both spoken audio and text forms. Steps may include translating the at least one phrase into text form for display to the user. Steps may include receiving a reviewed version of the text form and converting the reviewed version of the text form into a context free grammar based on text indicated as validated text.

In accordance with one embodiment of the present invention, a method for acoustically training a speech recognition engine of a speech recognition software application includes receiving audio data representing a user's voice speaking at least one phrase, the at least one phrase being unknown to the speech recognition engine in both spoken audio and text forms. The speech recognition engine, using a processor, can translate the at least one phrase into text form for display to the user. A reviewed version of the text form can be received, and the speech recognition software application, using a processor, can convert the reviewed version of the text form into a context free grammar based on text indicated as validated text.

In accordance with one embodiment of the present invention, a speech recognition system can be acoustically trained with free text audio. The system can include a speech recognition software application operating on a computing device having a processor. The speech recognition software application can further include a speech recognition engine; a comparison module configured to receive an indication of validated text and associate the validated text with at least one word from the free text audio; and a plurality of voice models. Upon receipt of a plurality of instances in which validated text is associated with the at least one word from the free text audio, the speech recognition software application can select a subset of voice models of the plurality of voice models in such a way that the subset of voice models shares a plurality of characteristics with the free text audio associated with the validated text.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a system and method providing acoustic training of a voice or speech recognition engine and/or voice or speech recognition software application. Instead of requiring a user to read from a prepared or predetermined script, the system and method of the present invention enable acoustic training using any free text spoken phrases provided by the user directly, or by a previously recorded speech, presentation, or the like, performed by the user. The system and method of the present invention receive the audio data representing the spoken phrases and convert the phrases into text. The text is displayed for a user to compare against the original audio data and validate, indicating which conversions were accurate and which were not. This information is returned to the speech recognition software application, which then generates a context free grammar, based on the edited and validated speech. Once a predetermined amount of audio data has been validated, the software application performs a calibration, in which the validated speech is sent to the speech engine for it to compare with voice models and select the closest match. Further continued training of the software application can collect further instances of validated speech, and this information can be used to further refine the voice model.

Figure 1:
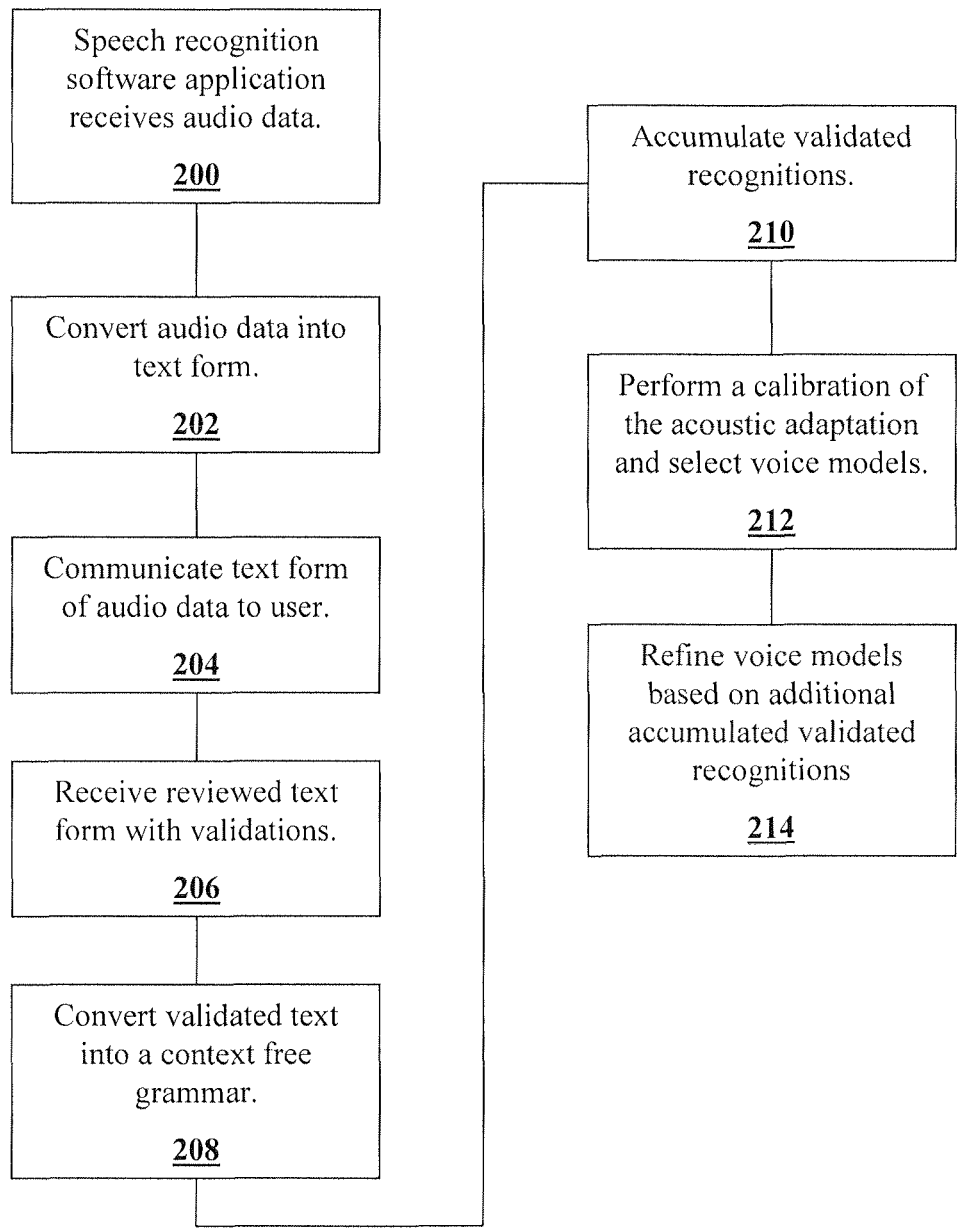
FIG. 1 is a flowchart representing one example implementation of a method of acoustically training a speech recognition software application in accordance with one embodiment of the present invention.
Figure 2:
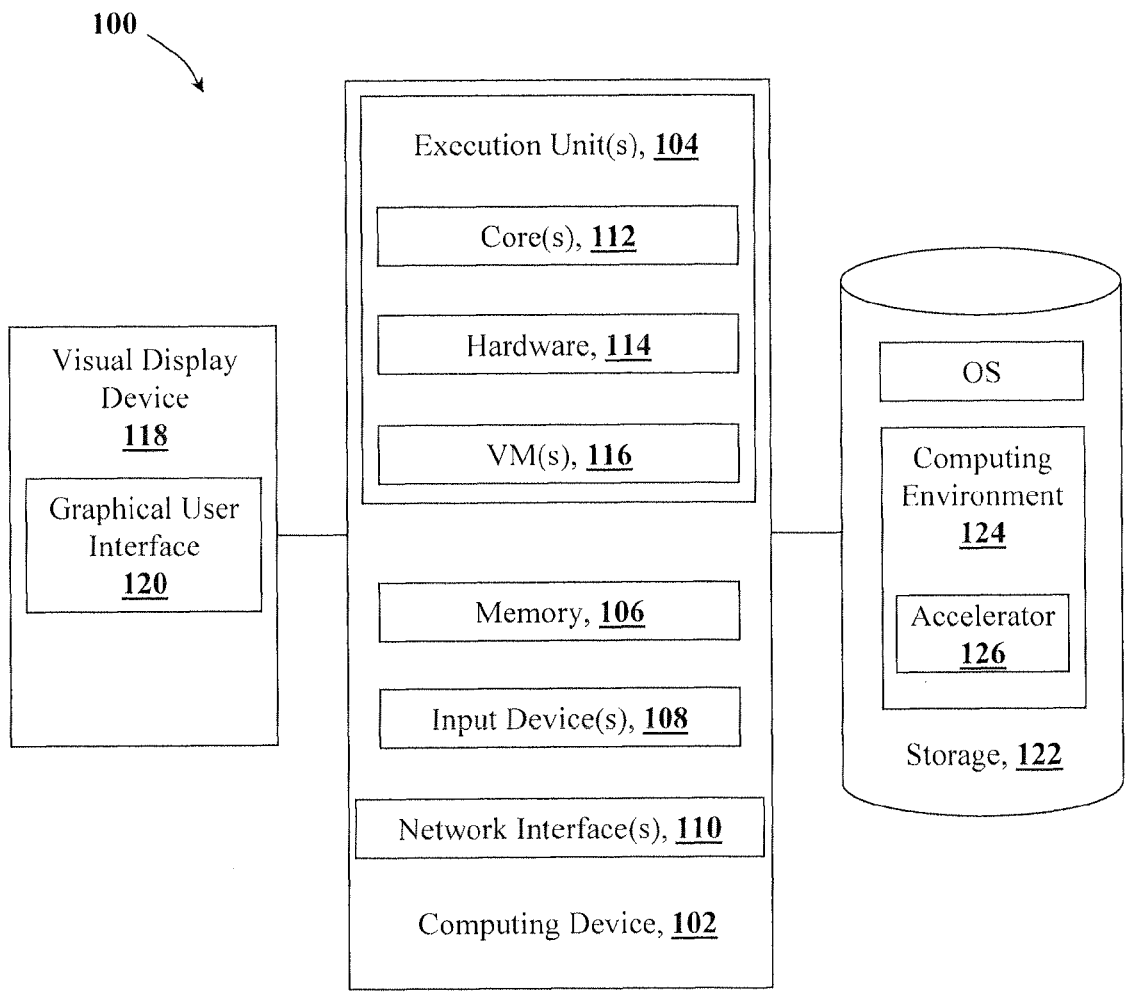
FIG. 2 is a diagrammatic illustration of a computing environment and computing device for implementation of the present invention.

FIGS. 1 and 2, wherein like parts are designated by like reference numerals throughout, illustrate an example embodiment of a system and method for free text acoustic training according to the present invention. Although the present invention will be described with reference to the example embodiment illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

The system and method of the present invention make use of free text voice to acoustically train a speech recognition engine. The phrase "free text voice" as utilized herein means spoken text that is not derived from scripted text predetermined by the speech recognition engine, the speech recognition software application, or the like. Said differently, conventional acoustical training procedures for speech recognition technologies require use of a scripted collection of words and phrases, and that a user desiring to train the engine read the scripted, predetermined, prepared text. Free text voice represents spoken words and phrases that are not specifically selected or required in some manner by the speech recognition software application. For example, the free text voice can be an audio or audio and video recording of a presentation or speech previously given by the user on any topic. The free text voice can be a reading of a randomly selected portion out of a book having no connection or relationship to the speech recognition software application or speech recognition engine. Other virtually limitless options for the free text voice source are possible, and expected, for use in conjunction with the present invention. One benefit provided by the present invention is that it can rely completely on free text voice for acoustical training of the speech recognition engine, instead of the conventional approach of requiring the user to read a scripted collection of words or phrases. Furthermore, the free text voice can be previously recorded, or it can be provided live, in real-time. The present invention enables the user to avoid having to spend substantial time doing the acoustical training, and instead the user may provide a pre-existing recording and use that for the acoustical training.

Turning to FIG. 1, an example embodiment of the method of the present invention will now be discussed. A voice or speech recognition engine receives audio data (step 200). The audio data represents a user's voice speaking at least one phrase of free text voice, which is derived from text previously unknown to the speech recognition engine in its particular form in both spoken audio and text forms. The audio data can be in a number of different formats, including analog, digital, raw bitstream, container format, audio data format, or the like. In terms of the more common audio data format, there are a number of sub-formats within this category, including uncompressed audio formats (e.g., WAV, AIFF, AU or raw header-less PCM), lossless compression formats (e.g., FLAC, Monkey's Audio (filename extension APE), WavPack (filename extension WV), Shorten, Tom's lossless Audio Kompressor (TAK), TTA, ATRAC Advanced Lossless, Apple Lossless, MPEG-4 SLS, MPEG-4 ALS, MPEG-4 DST, and WMA Lossless), and formats with lossy compression (e.g., MP3, Vorbis, Musepack, AAC, ATRAC, and lossy WMA). If the audio data is not in the required format for the particular speech recognition engine, then the audio data must be converted to the required format prior to acceptance by the speech recognition engine. This conversion process can be carried out according to a number of conventional practices, as is understood by those of ordinary skill in the art.

The speech recognition engine converts the audio data into text form (step 202) using available speech recognition technologies. The translation of the spoken word into text is a complex process that several known speech recognition engines perform, and thus will not be further described herein. Example speech recognition software applications containing the requisite speech recognition engine include Dragon® NaturallySpeaking® from Nuance Communications, Inc., and MacSpeech® Dictate from MacSpeech, Inc. Those of ordinary skill in the art will appreciate that the present invention is not limited to these example speech recognition software applications, but that other applications and engines are compatible for use in conjunction with the present invention. Accordingly, the present invention is in no way limited to use only with these applications.

The text form of the audio data is then communicated and displayed to the user (step 204). The text form of the audio data can be communicated to the user a number of different ways. For example, the text can be displayed on a monitor or other display, the text can be transmitted to the user for display on a remote device, the text can be stored in a memory storage device for later viewing, and the like. The text is reviewed for accuracy and validation relative to the audio data representing the spoken words or phrases of the user as described below. Once the text has been reviewed, the reviewed and revised version of the text, containing indications of validated text, is returned to the speech recognition software application.

Continuing with the method, the speech recognition software application receives back a reviewed version of the text form (step 206). The reviewed version of the text form contains indications of validated text, i.e., text that has been indicated to match the spoken word or phrase that it represents, as well as revisions when text was incorrectly recognized. The speech recognition software application converts the reviewed and revised version of the text form into a context free grammar based on the validated text (step 208).

A context-free grammar (CFG) is a formal grammar in which every production rule has a specific form of V→w, where V is a non-terminal symbol and w is a string consisting of terminals and/or non-terminals. The term "context-free" comes from the fact that the non-terminal V can always be replaced by w, regardless of its context. CFG is known to those of ordinary skill in the art of programming languages and compilers, such that additional description of this known concept is not necessary herein. Speech recognition engines conventionally provide a limited number of recognition grammars, including free-form dictation grammars in which words are substantially independent of one another.

The context free grammar that is developed by the speech recognition software application is most often relatively simple. However, the grammar may have several branches to accommodate edited text that corresponds to multiple possible interpretations. More specifically, terminals are objects representing the smallest unit of speech that the speech recognition software application can recognize. Terminals are typically words or punctuation symbols. Terminals are the concrete, indivisible, building blocks at the base of all context free grammars. Non-terminals are composed of sequences or alternatives of terminals and/or other non-terminals. All speech recognition systems supporting recognition of context free grammars allow programmers to specify those grammars by using system-specific programming interfaces to create terminals and to build non-terminals from sequences or alternatives of terminals and/or non-terminals. The context free grammar that is developed by the speech recognition software application is most often extremely simple. The text is divided into a sequence of terminals, and the speech recognition software application invokes APIs to define those terminals and to construct a single rule whose definition is exactly that sequence of tokens. However, because some text can be spoken in multiple ways (for example, a user may have spoken several different utterances to generate the text "2010", including "two thousand ten", "twenty ten", "two oh one oh", etc.) the method must sometimes create multiple alternatives and insert them into the sequence instead of a single simple token, each alternative itself being a sequence of one or more terminals corresponding to the many ways the text could have been spoken. Again, all speech recognition systems supporting recognition of context free grammars provide their own specific programming interfaces to create those alternatives. All of this information is then forwarded to the speech recognition engine for it to process and ultimately to find a path through the context free grammar matching the audio phrase spoken.

The user of the speech recognition software application may continue to provide audio data for translation into text. The speech recognition software application generates text that can be reviewed and validated by the user, and continues to track the validations, and accumulate validated recognitions (step 210) until enough data is available to perform a calibration stage of acoustic adaptation. When the speech recognition software application receives validated text, the speech recognition software application compares the text with previously validated text, and tracks when the speech recognition software application has successfully converted audio to text for a word or phrase that had previously been validated. In other words, once the speech recognition software application has been initially trained on a particular word or phrase, the speech recognition software application tracks when the training is confirmed with an additional successful recognition of that same word or phrase. When this occurs, the instance is added to the accumulated validated recognitions. The amount of data required will be specific to the particular speech recognition software application. However, an example would be 15-30 seconds of audio data minimum. One of ordinary skill in the art will appreciate that the present invention is by no means limited in any way by this range of audio data quantity. Rather, the range provided is merely representative of one illustrative example software application using current technology. It is understood that other applications may require more or less data, and that over time technology may improve to further reduce this requirement.

Once a sufficient amount of data has been accumulated, the speech recognition software application proceeds with calibration (step 212). During calibration, the accumulated validation data is sent to the speech recognition engine, which then selects initial properties of an acoustic match. Example properties or characteristics that are considered include pitch, typical speech rate, consistent departures from normal speech in the distribution of relative frequencies in vowel pronunciation, accent, and the like. This is carried out by the speech recognition engine narrowing down a list of available voice models to those which meet the criteria derived from the accumulated validation data, and ultimately to narrow down the voice models to those which are more similar to the user's voice, and discard those models that are significantly different from the user's voice.

Once a first calibration has occurred, the speech recognition software application will use the selected voice models in further attempts to convert the audio data it receives into text. The speech recognition software application continues to accumulate validation data with each additional instance of a successfully converted audio to text word or phrase, and when there is again enough additional data, the speech recognition software application then performs a primary stage of acoustic adaptation, to further refine the voice models (step 214). To perform the primary stage of acoustic adaptation, the speech recognition software application can take a number of different approaches. For example, the speech recognition software application will complete the steps of calibration and then determine a typical pitch spoken by the user, a measurement of how consistent the user's speech may be, a frequency response in the combination of the user's vocal signal and the audio hardware, signal to noise ratio in the environment, potentially additional selection from internal voice models (assignment of weights to several models that have differing degrees of similarity to the user's voice), and the like.

In using the system and method of the present invention, the user is not required to read from a prepared script, or prepared text that is previously known to the speech recognition software application. As such, if existing audio recordings are available, there is no requirement that the user spend any additional time reading aloud. In addition, the process of reviewing the converted text and indicating which recognized text is correct or incorrect does not have to be completed by the user that is providing the audio. The review and validation of the text form of the audio data can be performed by a third party delegate of the user. The user can provide the third party delegate with a copy of the audio file, and a copy of the text form of the audio data. Alternatively, the audio may be sufficiently simple or the third party may be sufficiently familiar with it, that there is no need for the user to provide the third party with a copy of the audio file, as would be understood by one of ordinary skill in the art. The third party delegate can listen to the audio and review the text, or just review the text, and indicate which text is correct or incorrect, in effect validating the text form of the audio. Once this review is complete, the third party delegate, or the user, or another individual, can transmit the validated text back to the speech recognition software application, as described in step 206 of FIG. 1. As such, the present invention creates and uses data structures, specifically CFGs, for text that is reviewed and validated in correspondence with existing audio data, instead of requiring that those data structures be pre-built for predetermined or scripted text, which a user must read live.

Additionally, the illustrative system can enable the user to improve productivity during the calibration process. As described previously, the acoustic training process of conventional systems generally involves recitation of a predetermined script that is entirely unrelated to the user's work or other practical applications by the user. The illustrative system, on the other hand, can collect data based on scripts or passages that are selected or created by the user. If the user selects or creates scripts or passages that are related to the user's work or other practical applications, then the user can produce a useful finished product as a result of the data collection and calibration processes. Said differently, although the data collection process of the illustrative system may still require some effort on behalf of the user or the user's third party delegate, it further distinguishes over existing systems by enabling improved productivity during calibration. This is due to the additional flexibility provided by the illustrative system regarding the particular content of the scripts, text, or other audio data that are used by the illustrative system for calibration.

FIG. 2 depicts a computing environment 100 suitable for practicing exemplary embodiments of the present invention. As indicated herein, the present system and method can be implemented on a computing device 102 operating the speech recognition software application. The computing environment 100 includes the computing device 102, which may include execution units 104, memory 106, input device(s) 108, and network interface(s) 110. The execution units 104 may include hardware or software based logic to execute instructions on behalf of the computing device 102. For example, depending on specific implementation requirements, execution units 104 may include: one or more processors, such as a processor; single or multiple cores 112 for executing software stored in the memory 106, or other programs for controlling the computing device 102; hardware 114, such as a digital signal processor (DSP), a graphics processing unit (GPU), a field programmable gate array (FPGA), an application specific integrated circuit (ASIC), etc., on which at least a part of applications can be executed; and/or a virtual machine (VM) 116 for executing the code loaded in the memory 106 (multiple VMs 116 may be resident on a single execution unit 104).

Depending on specific implementation requirements, the memory 106 may include a computer system memory or random access memory (RAM), such as dynamic RAM (DRAM), static RAM (SRAM), extended data out RAM (EDO RAM), etc. The memory 106 may include other types of memory as well, or combinations thereof. A user may interact with the computing device 102 through a visual display device 118, such as a computer monitor, which may include a graphical user interface (GUI) 120. The computing device 102 may include other I/O devices, such as a keyboard, and a pointing device (for example, a mouse) for receiving input from a user. Optionally, the keyboard and the pointing device may be connected to the visual display device 118. The computing device 102 may include other suitable conventional I/O peripherals. Moreover, depending on particular implementation requirements of the present invention, the computing device 102 may be any computer system such as a workstation, desktop computer, server, laptop, handheld computer or other appropriate form of computing or telecommunications device that is capable of communication and that has sufficient processor power and memory capacity to perform the operations described herein.

Additionally, the computing device 102 may include interfaces, such as the network interface 110, to interface to a Local Area Network (LAN), Wide Area Network (WAN), a cellular network, the Internet, or another network, through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), synchronous transfer mode (STM), wireless connections (e.g., 802.11), high-speed interconnects (e.g., InfiniBand, gigabit Ethernet, Myrinet) or some combination of any or all of the above as appropriate for a particular embodiment of the present invention. The network interface 110 may include a built-in network adapter, network interface card, personal computer memory card international association (PCMCIA) network card, card bus network adapter, wireless network adapter, universal serial bus (USB) network adapter, modem or any other device suitable for interfacing the computing device 102 to any type of network capable of communication and performing the operations described herein.

The computing device 102 may further include a storage device 122, such as a hard-drive, flash-drive, or CD-ROM, for storing an operating system (OS) and for storing application software programs, such as the computing application or environment 124. The computing environment 124 may run on any operating system such as any of the versions of the conventional operating systems, any embedded operating system, any real-time operating system, any open source operating system, any proprietary operating system, any operating systems for mobile computing devices, or any other operating system capable of running on the computing device and performing the operations described herein. Furthermore, the operating system and the computing environment 124 may in some instances be run from a bootable CD. The computing environment 124 may include an accelerator 126 that enables a computing application or computing environment 120 to compute one or more elementwise expressions in parallel.

One of ordinary skill in the art will appreciate that the above description concerning the computing environment 100 and computing device 102 is intended to encompass all conventional computing systems suitable for carrying out methods of the present invention. As such, any variations or equivalents thereof that are likewise suitable for carrying out the methods of the present invention are likewise intended to be included in the computing environment 100 described herein. Furthermore, to the extent there are any specific embodiments or variations on the computing environment 100 that are not suitable for, or would make inoperable, the implementation of the present invention, such embodiments or variations are not intended for use with the present invention.

The computing device 102 may run software applications, including voice or speech recognition software applications, such as, for example, MacSpeech® Dictate speech recognition software. Other speech recognition software applications can operate on the computing device 102, as would be understood by those of ordinary skill in the art. As such, the present invention is not limited to use only the applications named herein as illustrative examples.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved.

What is claimed is:

1. A speech recognition system that can be acoustically trained with free text audio, the system comprising:
   a speech recognition software application operating on a computing device having a processor, the speech recognition software application comprising:
      a speech recognition engine configured to receive the free text audio at the speech recognition engine which is unknown to the speech recognition engine previous to acoustical training of the speech recognition engine in both spoken audio and text forms, translate the free text audio into text form for display to a user, and receive a reviewed version of the text form and convert the reviewed version of the text form into a context free grammar based on text indicated as validated text as indicated by the user;
      a comparison module configured to receive an indication of the validated text and associate the validated text with at least one word from the free text audio; and
      a plurality of voice models;
   wherein upon receipt of a plurality of instances in which validated text is associated with the at least one word from the free text audio, the speech recognition software application selects a subset of voice models of the plurality of voice models in such a way that the subset of voice models shares a plurality of characteristics with the free text audio associated with the validated text.

2. The system of claim 1, wherein the speech recognition software application is configured to record each instance of validated text.

3. The system of claim 1, wherein the speech recognition software application is configured to record each instance of validated text, accumulating instances of validated text up to a first predetermined number of instances of validated text or duration of audio signal, and further wherein the speech recognition software application is configured to perform calibration of the speech recognition engine once the first predetermined number of instances of validated text or duration of audio signal has been achieved.

4. The system of claim 3, wherein calibration of the speech recognition engine comprises the speech recognition engine selecting initial properties of an acoustic match to a voice model.

5. The system of claim 1, wherein the speech recognition software application is configured to record each instance of validated text, accumulate instances of validated text up to a second predetermined number of instances of validated text or duration of audio signal, and further wherein the speech recognition software application is configured to perform refining calibration of the speech recognition engine once the second predetermined number of instances of validated text or duration of audio signal has been achieved.

6. The system of claim 1, wherein the free text audio comprises a previously recorded audio recording of the user's voice speaking.

7. The system of claim 1, wherein the free text audio comprises a real-time data representation of the user's voice speaking.

* * * * *